Figure 1:
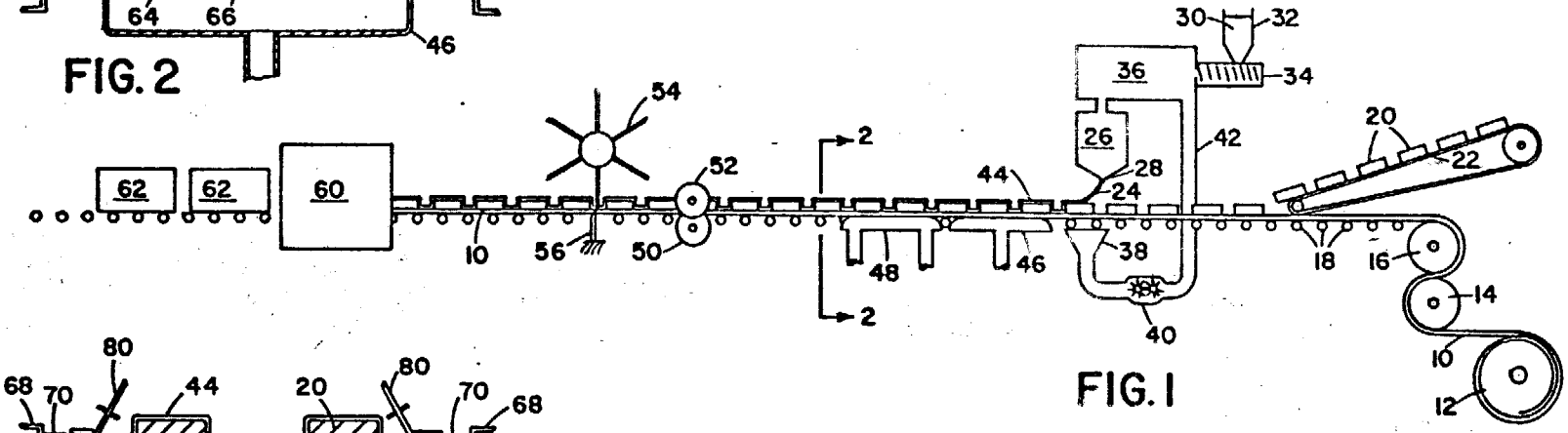
Figure 2:
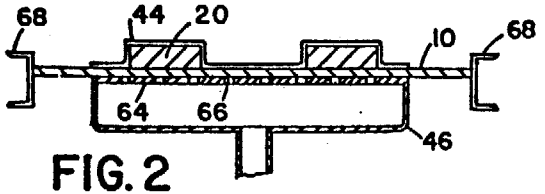
Figure 3:
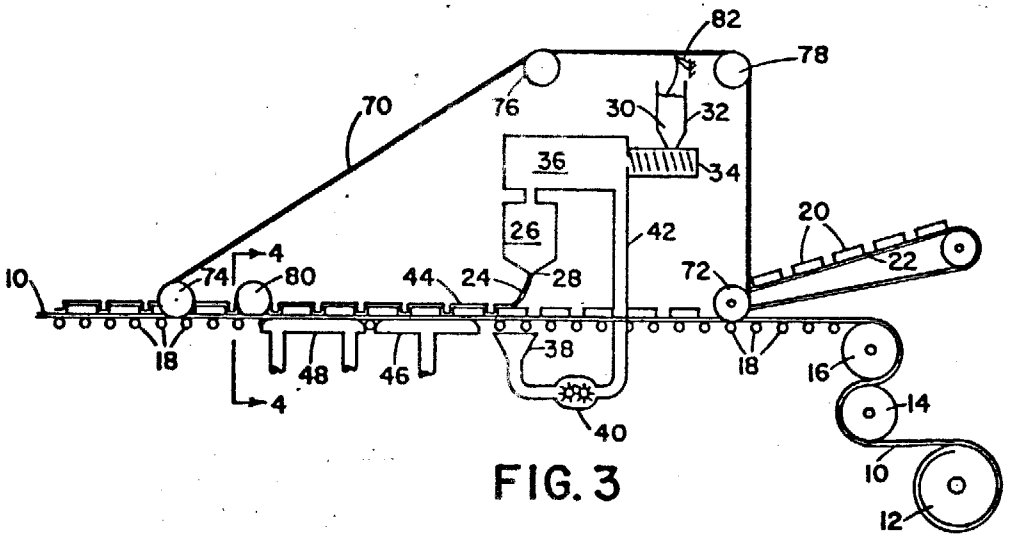
Figure 4:
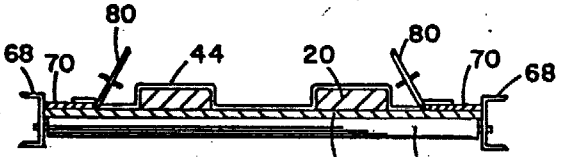

264-37.25

C4504 OR SR T857005

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 3, 1968

857 O.G. 42

T857,005

608,607

METHOD AND APPARATUS FOR CURTAIN COATING ARTICLES WITH A HOT MELT ON A CONTINUOUS MOVING AIR-PERMEABLE SUBSTRATE

Rex Eells and David E. Stooksbury, both % Tennessee Eastman Company, P.O. Box 511, Kingsport, Tenn. 37662

Filed Jan. 11, 1967. Published Dec. 3, 1968
Class 264—37
1 Sheet Drawing. 16 Pages Specification Method and apparatus for packaging articles supported on an air-permeable web in large numbers at high speed employing a falling curtain of hot molten rather viscous thermoplastic material which is continuously deposited as a preferably transparent film on the articles and web while in motion above vacuum producing means so as to draw the film into close contact. An endless moving band can be positioned along one or both sides of the moving web so as to intercept excess thermoplastic material which can advantageously be removed from the band and returned to the curtain forming means.

264-37.25
C4504 OR
SR
T857005
SEARCH ROOM

Dec 3 1968

T857,005
608607

REX EELLS
DAVID E. STOOKSBURY
*INVENTORS*

BY William J. Crozier
Charles L. Good
ATTORNEYS